United States Patent [19]

Reise

[11] E Re. 30,550

[45] Reissued Mar. 24, 1981

[54] AUTOMATIC TRAILER SWAY SENSING AND BRAKE APPLYING SYSTEM

[75] Inventor: Herman A. Reise, Lakewood, N.J.

[73] Assignee: Durrell U. Howard, San Antonio, Tex.

[21] Appl. No.: 31,091

[22] Filed: Apr. 18, 1979

Related U.S. Patent Documents

Reissue of:

[64] Patent No.: 4,040,507
Issued: Aug. 9, 1977
Appl. No.: 629,603
Filed: Nov. 6, 1975

[51] Int. Cl.[3] ..... B60T 7/20

[52] U.S. Cl. ..... 188/112 A; 180/282; 280/446 B; 303/7; 303/20

[58] Field of Search ..... 303/3, 7, 20; 340/53; 180/282; 188/112 R, 112 A; 280/432, 446 B, 6.1, 6 H, 6 R, DIG. 1; 91/517, 518

[56] References Cited

U.S. PATENT DOCUMENTS

| | | | |
|---|---|---|---|
| 3,277,791 | 10/1966 | Williams et al. | 188/314 X |
| 3,288,240 | 11/1966 | Franzel | 180/103 BF X |
| 3,398,991 | 8/1968 | Compton | 188/112 A |
| 3,736,894 | 6/1973 | McKeen | 188/318 X |
| 3,758,165 | 9/1973 | Savelli | 180/103 BF X |
| 3,796,288 | 3/1974 | Hollnagel | 280/446 B X |
| 3,810,521 | 5/1974 | Sparr | 188/112 A |
| 3,861,696 | 1/1975 | Gustaffson | 280/707 X |
| 3,861,717 | 1/1975 | Knox | 280/446 B |
| 3,894,773 | 7/1975 | Cleveland et al. | 180/103 BF X |
| 3,948,544 | 4/1976 | Presley et al. | 188/112 A |
| 3,993,360 | 11/1976 | Greene | 188/112 X |
| 3,993,362 | 11/1976 | Kamins et al. | 303/7 X |

*Primary Examiner*—Trygve M. Blix
*Assistant Examiner*—Reinhard J. Eisenzopf
*Attorney, Agent, or Firm*—Pollock, Vande Sande & Priddy

[57] ABSTRACT

An apparatus for automatically sensing trailer sway and applying trailer brakes, thereby minimizing or eliminating the sway is provided. A hydraulic device, similar to a shock absorber with the addition of a pressure operated switch at each end of the cylinder, is mounted between the trailer A frame and the hitch head assembly. A sudden sway in either direction causes one of the switches to close and apply power to the electric trailer brakes thus minimizing or eliminating the sway and causing the car and trailer to "line up". The hydraulic device has an orifice in the piston or at each end of the cylinder so that normal turns made by the car and trailer do not cause sufficient pressure build up to cause either switch to operate. Similar automatic performance can be realized by the use of a gas filled bellows device.

12 Claims, 8 Drawing Figures

AUTOMATIC TRAILER SWAY SENSING AND BRAKE APPLYING SYSTEM

Matter enclosed in heavy brackets [ ] appears in the original patent but forms no part of this reissue specification; matter printed in italics indicates the additions made by reissue.

GENERAL DESCRIPTION OF THE INVENTION

One of the greatest dangers in towing a trailer is swaying and jackknifing. This can be caused by quick evasive action by the driver, gusty winds or air currents caused by other vehicles, especially large tractor trailers, overtaking and passing the towing and towed vehicle. When a vehicle overtakes and passes a towed vehicle, the driver of the towing vehicle should (1) keep as far away from the passing vehicle as the road will permit, (2) apply more gas to the towing vehicle [and or] *and/or* (3) slightly apply the trailer brakes. Methods (2) and (3) result in greater tension between the towing and towed [vehicle] *vehicles* thereby tending to minimize the possibility of swaying. Method (2), applying more gas, is not desirable under level or especially down hill road conditions for swaying tendencies and loss of control are greater under higher speeds and downhill conditions. All of these methods depend upon proper driver reactions to the then existing circumstances.

Normally a manual trailer brake control is provided at a convenient position for the driver. This manual control is also hydraulically or mechanically coupled to the foot brake of the towing vehicle. Proper driver reaction and his reaction time to apply the manual trailer brakes are very important in preventing or minimizing a sway. An automatic device or system that will sense a sway and automatically apply the trailer brakes is desirable in that it detects the beginning of an abnormal sway and immediately applies the trailer brakes. Such a system must cause the brakes to be released as soon as the sway is miminized or eliminated. Normal turns during highway driving or parking of the trailer must not cause the brakes to be applied. The Automatic Trailer Sway Sensing and Brake Applying System covered in this patent application does, as the title implies, meet the sway sensing and brake applying needs of trailer towing and towed vehicles.

The basic part of this system is a hydraulic unit similar to a shock absorber except that the forces required to compress or extend the unit are essentially equal. In addition, the unit is manufactured with pressure operated switches at each end of the hydraulic cylinder. The rubber inserts used on the shock absorber mounting details must not be used on the hydraulic sway sensing unit. The presence of such rubber inserts would result in a delay in the time of application of the brakes as well as an increase in the amplitude of the sway before the brakes are applied. A metal universal joint type of connection or mounting detail with a minimum of bearing clearance must be used. The hydraulic unit can be small to perform the sway sensing and brake applying functions only or the pressure operated switches can be made a part of hydraulic anti-sway devices during manufacture.

SUMMARY

This sway sensing and brake applying system can be used in conjunction with anti-sway devices that are commercially available. It automatically senses the beginning of a sway and automatically applies the trailer brakes. The brakes are automatically released as soon as the sway is minimized or eliminated. Brakes are not applied during normal driving turns or parking procedures.

The brake applying pressure operated switches can be made a part of hydraulic type anti-sway devices during manufacture. Such units then perform the dual function of an anti-sway device and an automatic sway sensing and brake applying system.

DETAILED DESCRIPTION OF THE DRAWINGS

Figure 1:
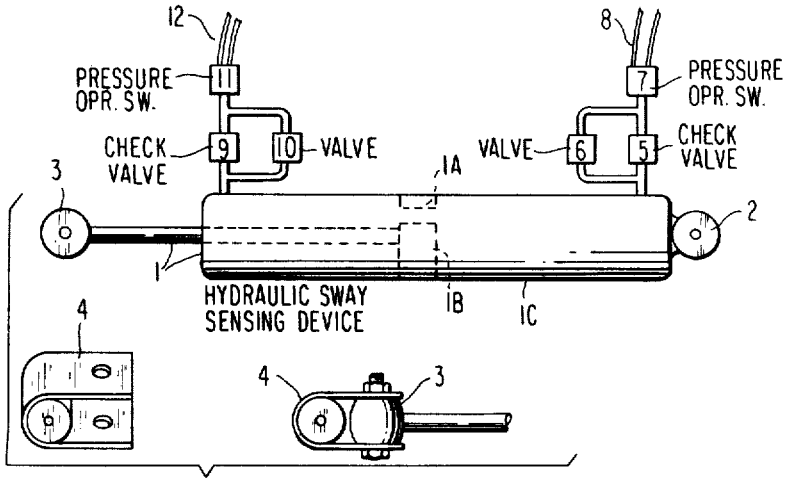
FIG. 1 This simplified drawing of the hydraulic unit shows, in block form, a check valve, bypass orifice and pressure operated switch on each end of the hydraulic cylinder.
Figure 2:
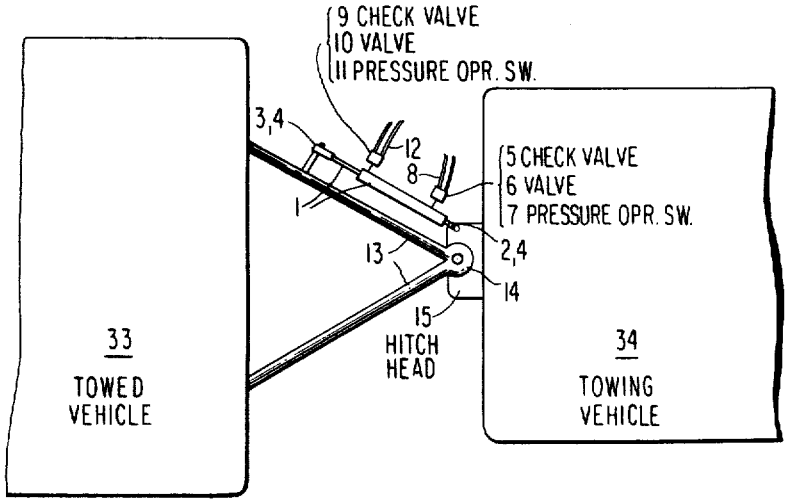
FIG. 2 [A section] *Sections* of the towing and towed [vehicle] *vehicles* and the manner in which one end of the hydraulic sway sensing unit is mounted to the A frame and the other end is mounted on the hitch head, a short distance from the hitch ball, [is] *are* shown.

The basic unit of the Automatic Sway Sensing and Brake Applying System is shown in FIG. 1. The hydraulic unit 1 is similar to a shock absorber except that the fluid escapement orifice *1A* in the piston *1B* or at each end of the cylinder *1C* is such that the force required to elongate the unit is essentially the same as that required to compress or shorten the unit. Mounting details 2 and 3 must not have rubber inserts as they normally have in shock absorbers. Hydraulic check valves 5 and 9 have adjustable bypass valves 6 and 10 in parallel with them. Pressure operated switches 7 and 11 have either wire or terminal connections represented by 8 and 12. A universal joint type element 4 is mounted to 2 and 3 by means of a through bolt. The other ends of the universal elements are then mounted to the A frame 13 of the towed vehicle 33 and the hitch head 15 of the towing vehicle 34 as shown in FIG. 2. The universal joint 4 that is bolted to 2 is in turn mounted on a supporting pin on the hitch head 15 a short distance from the hitch ball 14. The purpose of check valves 5 and 9 is to allow free passage of hydraulic fluid to pressure operated switches 7 and 11. The fluid must return to the cylinder through adjustable valves 6 and 10. A slight delay in the opening of switches 7 and 11 has thereby been introduced to keep the brakes energized for a short period after the rate of swaying has been reduced. For a given operational requirement, fixed orifices can be used in place of valves 6 and 10. The combination of valves 6 and 10 (or fixed orifices) and check valves 5 and 9 is shown to obtain the ultimate in sway correction. Considerable, and in most cases adequate, sway correction is realized without the use of 5, 6, 9 and 10. In applications where a delay in releasing the brakes is considered desirable it can also be done by means of electrical delay circuits.

Figure 3:
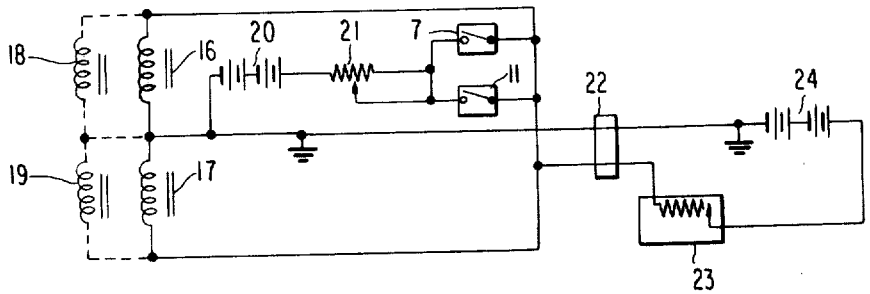
FIG. 3 The electrical brake circuit, including the pressure operated switches for a one or two axle trailer, is shown.

A schematic of the electrical circuit is shown in FIG. 3. The towing vehicle battery 24 is connected to the brake control unit 23 which is located in a convenient position for the driver to reach and operate. Plug and connector 22 provide circuit connection from the towing vehicle to the towed vehicle. Not shown in the simplified diagrams are the tail light, stop light, direction signal light, running lights and inter battery connections normally provided through connector 22. Electromagnets of the brakes of a single axle trailer are represented by 16 and 17. In trailers with two axles, the electromagnets 18 and 19 are shown by dashed lines. Trailer battery 20 supplies the brake operating current through adjustable resistor 21 and pressure operated switch 7 or 11. Adjustable resistor 21 is set in accordance with one or two axle brake requirements.

Figure 4:
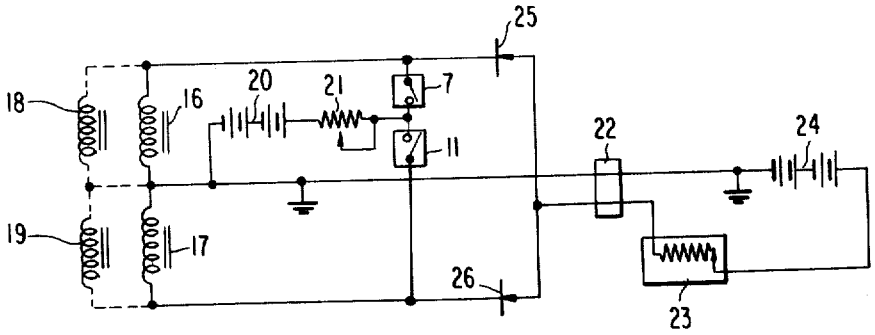
FIG. 4 In this circuit the pressure operated switches will cause the brake or brakes on one side or the other only to be applied. This results in quicker corrective action.
Figure 5:
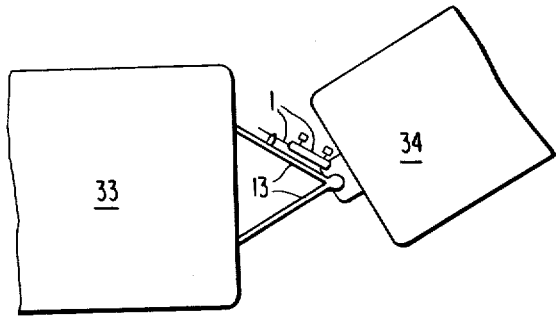
FIG. 5 This figure is used to describe the operation under FIG. 4 conditions.

Quicker sway correction can be realized by using the trailer brake circuit shown in FIG. 4. This can be described by referring to FIG. 5. If an abnormally fast left turn of the towing vehicle takes place, pressure switch 7 will close and cause only the trailer left wheel brake or brakes to be applied. This will cause the front of the trailer to move to the left and thereby provide [the force required] *a force tending* to "line up" the towed and towing vehicles. If the towing vehicle in effect makes an abnormally fast right turn, pressure operated switch 11 closes and applies the trailer right wheel brake or brakes. Diodes 25 and 26 provide the required electrical isolation when either switch 7 or 11 operate and yet permit current to flow to all brakes when brake control 23, in the towing vehicle, is operated.

Present day cars have, for safety reasons, a braking system in which the front wheel brakes and the associated controls are isolated from the rear wheel brakes and their associated control system. Both systems are actuated by the common brake pedal. In such a system, the chance of simultaneous failures of both systems is very remote. Therefore if one system fails you still have the braking capability of the other.

Figure 6:
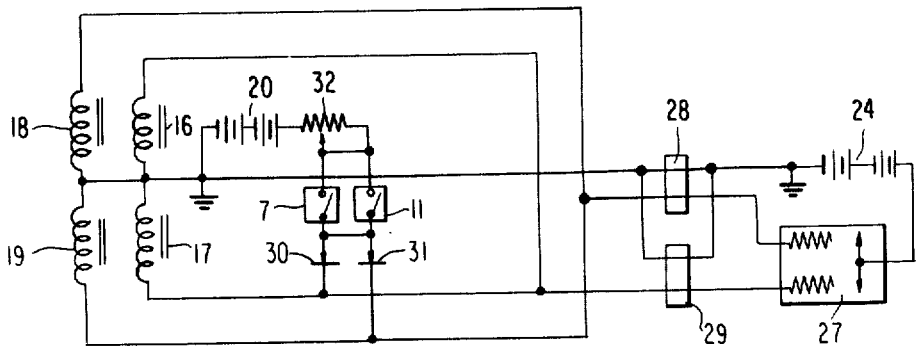
FIG. 6 A dual braking system, including the sway sensing pressure operated switches, is shown in this figure.

Practicaly all present day tandem axle trailers have a single electrical braking system. An open circuit in the main line, connector[,] *or* brake control or a short circuit anywhere in the electrical braking system will result in the loss of all brakes. A dual braking system should be used for tandem axle trailers for the same safety reasons that it is used in a car. Such a system, in conjunction with a sway sensing system, is shown in FIG. 6. Separate trailer front wheel brake wiring and rear wheel wiring is connected through separate plugs and connectors 28 and 29 to dual brake control 27. This figure shows the sway sensing pressure operated switches 7 and 11 connected in such a manner that the operation of either switch will apply braking power to all trailer brakes through diodes 30 and 31. When brake control 27 is operated, these diodes provide electrical isolation between the trailer front and rear axle brakes. In a case where the sway sensing system is not used, resistor 32, pressure operated switches 7 and 11, diodes 30 and 31 and the associated wiring are not used.

Figure 7:
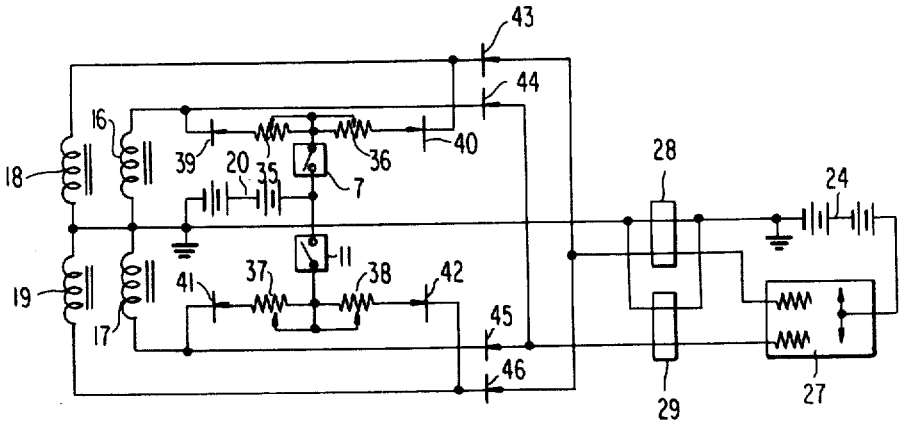
FIG. 7 The principle of appying the brakes on one side or the other only, in case of a sway, is shown for the dual braking system in this figure. In addition, isolation resistors and diodes are provided to eliminate the possibility of complete braking failure in case of an electrical short or open circuit in the overall electrical circuit of the braking system.

A dual braking system in which the sway sensing system applies power to the appropriate left or right trailer brakes only is shown in FIG. 7. Diodes 39, 40, 41, 42, 43, 44, 45 and 46, and resistors 35, 36, 37 and 38 provide electrical isolation for dual brake control 27 operation [and or] *and/or* sway sensing switch 7 or 11 operation in a manner that provides maximum protection against possible circuit failure such as a short circuit or open circuit in the braking system.

Figure 8:
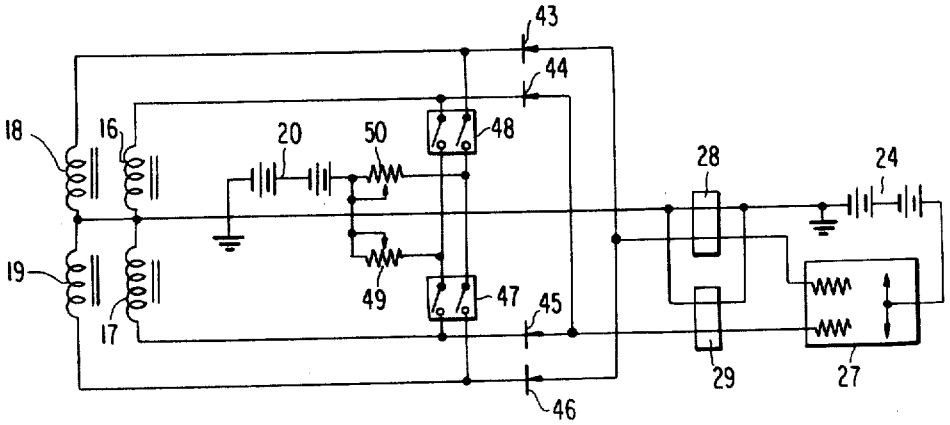
FIG. 8 Functionally this circuit is similar to that shown in FIG. 7 except that some of the isolation is provided by using two pole pressure operated switches.

Some simplification of the circuit shown in FIG. 7 can be realized by using double pole pressure operated switches 47 and 48 *as* shown in FIG. 8. Basically the same type of electrical isolation against complete braking system failure in case of open or short circuit conditions is realized with the circuit shown in FIG. 8 as in FIG. 7.

I claim:

1. A sway control system for controlling brakes of a towed vehicle in response to the detection of a sway condition comprising:

a hydraulic unit having first and second ends mounted to coupling means between the towed vehicle and a towing vehicle, which hydraulic unit includes first and second fluid passages associated with said first and second ends of the unit, each passage including a check valve shunted by a bypass restricted orifice and a pressure switch, and an electric brake circuit for applying and releasing the brakes of the towed vehicle in response to said pressure switches being opened or closed, said hydraulic unit constituting a sway detection device for sensing the onset of a sway condition of a towed vehicle relative to a towing vehicle.

*2. A sway control apparatus for controlling the brakes of a towed vehicle joined to a towing vehicle by a towing connection permitting turning movement of said towed and towing vehicles relative to each other about a yaw axis, said apparatus comprising:*

*signal generating means connected between said towed and towing vehicles for providing a signal having a characteristic responsive to the rate of change of the angle between said vehicles about said yaw axis; and,*

*actuator means for actuating said brakes in response to said signal, said actuator means being effective to actuate said brakes in response to a single turning movement between said vehicles in either direction about said yaw axis when said rate of angle change exceeds a predetermined magnitude.*

*3. The apparatus of claim 2 in which said signal generating means includes a first member, a second member movable relative to said first member, coupling means mounted on said towed and towing vehicles for causing said first and second members to move relative to each other as said towed and towing vehicles turn relative to each other about said yaw axis, and sensing means for providing a signal in response to a predetermined rate of said relative movement between said first and second members.*

*4. The apparatus of claim 3 in which said first member is a cylinder, said second member is a piston slidable in said cylinder, and said coupling means causes said piston to slide in said cylinder as said towed and towing vehicles turn relative to each other about said yaw axis.*

*5. The apparatus of claim 4 in which said piston and said cylinder define a chamber for pressurizing a fluid, and said actuator means includes pressure responsive means for actuating said towed vehicle brakes in response to a predetermined fluid pressure in said chamber.*

*6. The apparatus of claim 5 in which said sensing means includes conduit means for conveying said fluid between said chamber and said pressure responsive means.*

*7. The apparatus of claim 6 in which said conduit means includes valves means for controlling the flow of fluid through said conduit means.*

*8. The apparatus of claim 7 in which said valve means includes a check valve*

*9. The apparatus of claim 7 in which said valve means includes an orifice.*

*10. The apparatus of claim 7 in which said valve means is adjustable.*

*11. The apparatus of claim 6 in which said conduit means includes a first fluid passage containing a check valve for permitting free flow from said chamber to said pressure responsive means while preventing flow from said pressure responsive means to said chamber, and a second fluid passage bypassing said check valve and containing an orifice for restricting flow between said chamber and said pressure responsive means.*

*12. The apparatus of claim 2 in which said signal generating means includes cylinder means having a first chamber and a second chamber, piston means cooperating with said cylinder means for pressurizing a fluid in said first chamber and said second chamber, and coupling means for causing fluid in said first chamber to be pressurized in response to relative turning movement between said vehicles in one direction about said yaw axis and fluid in said second chamber to be pressurized in response to relative turning movement between said vehicles in the other direction about said yaw axis, and in which said actuator means includes pressure responsive means for actuating said towed vehicle brakes in response to a predetermined fluid pressure in said first and second chambers.*

* * * * *